3,694,151
METHOD OF MANUFACTURING α-STRONTIUM-HYDROPHOSPHATE

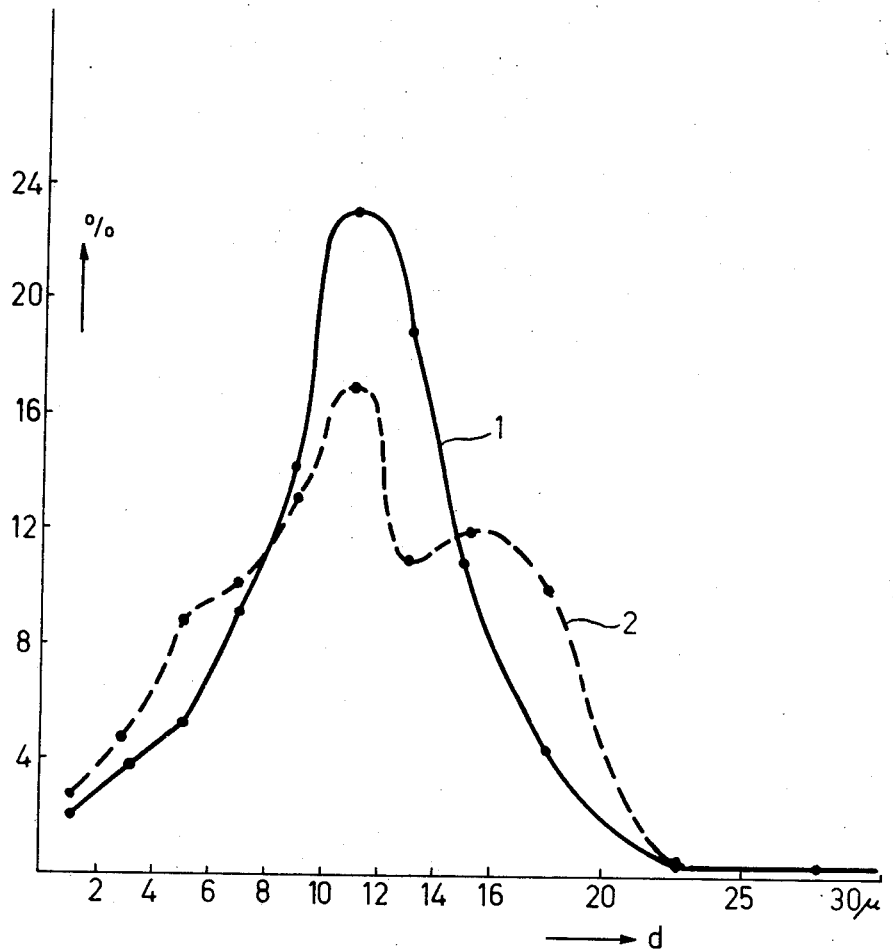

Adrianus Cornelis Josephus Maria Snethorst and Wilhelmus Petrus Johannes Looymans, both of Emmasingel, Eindhoven, Netherlands
Filed Oct. 30, 1970, Ser. No. 85,365
Claims priority, application Netherlands, Nov. 6, 1969, 6916743
Int. Cl. C01b *1/36, 25/32*
U.S. Cl. 423—307                                    8 Claims

ABSTRACT OF THE DISCLOSURE

A method of manufacturing α-SrHPO$_4$ by reacting aqueous solutions of a strontium salt and a monohydrophosphate in the presence of an aminopolycarboxylic acid.

---

The invention relates to a method of manufacturing α-strontiumhydrophosphate (α-SrHPO$_4$) in which aqueous solutions of a strontium salt and a monohydrophosphate are mixed at a temperature of between 40 and 100° C. Furthermore, the invention relates to crystalline α-SrHPO$_4$ manufactured in accordance with such a method and to a luminescent material obtained with the aid of such α-SrHPO$_4$.

Strontiumhydrophosphate is frequently used as a basic material in the manufacture of luminescent materials such as antimony-activated strontiumhalophosphate, europium-activated strontiumpyrophosphate and tin-activated strontium or strontiummagnesiumorthophosphate. In addition to stringent requirements of purity also certain requirements regarding crystallinity, grain size, grain shape and distribution according to grain size are imposed on strontiumhydrophosphate for these uses.

It is known that strontiumhydrophosphate may occur in two different crystal structures, the α-form and the β-form. Methods of manufacture are known from U.S. patent specification 3,113,835 both for obtaining the α-form and for obtaining the β-form. In both cases solutions of strontium salts which are soluble in water such as the chlorides, the nitrates, the acetates etc. are mixed with solutions of monohydrophosphate salts which are soluble in water such as those of the alkali metals or ammonia so that the insoluble strontiumhydrophosphate is precipitated. The temperature during precipitation determines the crystal structure of the strontiumhydrophosphate formed. At temperatures of less than approximately 40° C. only β-SrHPO$_4$ is formed and only the α-form is produced at temperatures of more than approximately 70° C. Mixtures of the two forms are produced in the intermediate temperature range.

The β-SrHPO$_4$ manufactured in this way consists of spherolite-like polycrystalline particles having a great specific surface. This β-SrPHO$_4$ is unsuitable for use as a basic material in the manufacture of luminescent materials because it is very reactive and gives rise to highly sintered luminescent powders which are poorly crystallized.

The α-SrHPO$_4$ manufactured in accordance with the method described above consists of monocrystalline grains which, although being suitable as a starting material in the manufacture of luminescent materials, are by no means ideal for use as a basic material for the manufacture of luminescent materials as regards grain size, grain shape and distribution according to grain size. In the first place said α-SrHPO$_4$ comprises comparatively many fine particles (<6μ) and also many large particles (>25μ). The distribution according to grain size of this material, that is to say, the curve plotted in a graph indicating which fraction (percent by weight) of the material has a certain size is therefore wide. In the second place needle or bar-shaped crystals are always obtained in accordance with the known method. It is known that grain size, grain shape and distribution according to grain size of the luminescent materials manufactured with the aid of strontiumhydrophosphate are substantially equal to the corresponding properties of the strontiumhydrophosphate used. The luminescent materials obtained with the aid of the known α-SrHPO$_4$ will therefore also comprise many fine particles which is quite undesirable because these fine particles poorly absorb the exciting radiation (for example, the ultraviolet radiation from a mercury vapour discharge lamp) so that these particles do not contribute to the radiation emitted by the luminescent material. In addition the fine particles give rise to a loss of the exciting radiation as a result of the reflection of this radiation on these particles. It is also disadvantageous when large particles occur in the luminescent material because they give rise to adhesion problems and an unfavourable appearance of the screen when the luminescent material is used on a screen. Finally the needle or bar shape of the luminescent particles has great drawbacks when applying a luminescent layer on a screen because particles of this shape are very difficult to stack to form a homogeneous uninterrupted layer.

The object of the present invention is to provide a method of manufacturing α-SrHPO$_4$ which does not have the said drawbacks.

According to the invention a method of manufacturing α-strontiumhydrophosphate (α-SrHPO$_4$) in which aqueous solutions of a strontium salt and of a monohydrophosphate are mixed at a temperature of between 40 and 100° C. so that the desired α-SrHPO$_4$ is precipitated is characterized in that an aminopolycarboxylic acid which is soluble in water or a salt thereof which is soluble in water is added to at least one of the solutions in a quantity of between 10$^{-3}$ and 100 mmol per litre calculated on the overall volume of the solutions.

Likewise as in the known methods aqueous solutions of strontium salts which are soluble in water, for example, chlorides, nitrates or acetates are mixed in a method according to the invention with aqueous solutions of monohydrophosphate salts which are soluble in water, for example, those of the alkali metals or of ammonia.

It has been found that addition of an aminopolycarboxylic acid which is soluble in water or a salt thereof which is soluble in water has a great influence on the grain size, the distribution according to grain size and particularly on the grain shape of the precipitated α-SrHPO$_4$.

The α-SrHPO$_4$ manufactured in accordance with a method according to the invention comprises monocrystalline grains whose distribution according to grain size is narrow as compared with the known α-SrHPO$_4$. Unlike the known α-SrHPO$_4$ whose grains always have an oblong bar or needle shape, the α-SrHPO$_4$ crystals manufactured in accordance with the invention have a rectangular shape whose length-to-width ratio may be considerably smaller than that of the known product. It is even possible to carry out the method according to the invention in such a manner that the largest portion of the crystals assumes the shape of square plates.

The explanation of the influence of the addition of an aminopolycarboxylic acid during the precipitation process on the grain shape of α-SrHPO$_4$ is not definitely known: it may be assumed that a selective absorption of the aminopolycarboxylic acid takes place at the crystal surface of the α-SrHPO$_4$ formed. The adsorption is selective, that is to say, it takes place at those crystal surfaces which comprise comparatively many strontium ions and results in the growth of the crystals in a direction perpendicular to the said surface being inhibited. This theory is supported by the fact that the activity of the aminopolycarboxylic acid is stronger as the relevant aminopolycarboxylic acid forms complexes with strontium ions whose stability is greater.

A further result of the addition of aminopolycarboxylic acid during the precipitation process is that the main grain size of the crystals assumes a lower value than in the case when this addition is omitted. As a greater concentration of aminopolycarboxylic acid is used, the main grain size of the precipitates α-SrHPO$_4$ is found to be smaller. It is found that aminopolycarboxylic acid promotes the formation of new crystals.

It has been found possible to manufacture luminescent powders with the aid of α-SrHPO$_4$ according to the invention which powders can satisfactorily be processed due to the favourable shape of the grains. The luminescent powders may easily be introduced into a suspension and thin, homogeneous and satisfactorily uninterrupted luminescent layers of particles satisfactorily absorbing ultraviolet radiation can be formed with the aid of these suspensions on a substrate, for example, the glass envelope of a discharge lamp.

The concentration of aminopolycarboxylic acid to be used in accordance with the invention is to lie within the limits stated above. The desired result is not achieved for concentrations of less than $10^{-3}$ mmol per liter. The use of aminopolycarboxylic acid in concentrations of more than 100 mmol per litre gives rise to the formation of very fine grains which are not suitable in practice or to agglomerates of very fine partciles. The concentration to be chosen for a certain case depends on the nature of the aminopolycarboxylic acid used, the desired extent of influence of the grain shape and the desired mean grain size. A compound which comprises aminopolyacetic acid groups is preferably chosen for aminopolycarboxylic acid because these compounds are cheap and readily available. Particularly ethylenediaminotetracetic acid (EDTA) or a soluble salt thereof is preferred in a concentration of between 0.05 and 5 mmol. per litre calculated on the overall volume of the two solutions.

A further aminopolycarboxylic acid which is readily available is 1,2 - diaminocyclohexanetetracetic acid (DCTA). DCTA or a soluble salt thereof has a greater effect on the α-SrHPO$_4$ crystals to be formed than the said EDTA and is therefore preferably used in smaller concentrations namely between 0.01 and 1 mmol per litre.

According to the invention the disodium salt and/or the diammonium salt of the aminopolycarboxylic acids is preferably used, for these salts are generally better soluble than the acids themselves.

The two salts from which the desired α-SrHPO$_4$ is formed by precipitation are preferably mixed by applying, per unit of time, molar equivalent quantities of the solutions, for example, from two supply vesels to a precipitation vessel. According to the invention the concentration of aminopolycarboxylic acid in the precipitation vessel is preferably maintained constant throughout the process because then crystals of substantially equal sizes are obtained. The spreading in grain size is then small and the distribution according to grain size is narrow.

When using the above-described method it is advantageous to introduce a quantity of water in the precipitation vessel in advance. After this quantity of water is brought to the temperature desired for the precipitation process, the two salt solutions are applied, while being stirred, to the precipitation vessel, the temperature in the precipitation vessel being maintained constant. The aminopolycarboxylic acid is preferably added in the concentration desired during the precipitation process to the quantity of water introduced in advance into the precipitation vessel and the remaining required aminopolycarboxylic acid is added to one of the two or to both salt solutions supplied.

In some cases a method according to the invention is preferred in which a quantity of from 1 to 10 vol. percent of the required strontium salt solution is introduced into a precipitation vessel whereafter the supply of molar equivalent quantities of the two solutions is started. In addition to the said quantity of the strontium salt solution the precipitation vessel may contain a quantity of water and aminopolycarboxylic acid in the desired concentration. In this manner an excess of hydrophosphate ions is prevented throughout the precipitation process. Such an excess gives rise to very fine α-SrHPO$_4$ crystals and may lead to the formation of strontiumhydroxyapatite which is undesirable. The excess of strontium ions present during precipitation is entirely converted into α-SrHPO$_4$ by the last quantities of hydrophosphate to be supplied after the supply of the strontium salt solution has been ceased.

The temperature at which precipitation takes place lies preferably between 80 and 90° C.

In order that the invention may be readily carried into effect it will now be described in detail with reference to an example, a number of tables and a figure.

EXAMPLE

A round-bottomed flask having a content of 5 litres was used as a precipitation vessel. Two dosage flasks were used for the constant supply of the salt solutions. The solutions used were a 1.75 molar solution of diammoniumhydrophosphate and a 1.75 molar solution of strontiumchloride. Prior to precipitation the flask was filled with a quantity of 1 litre of distilled water which was brought to a temperature of 85° C. with the aid of a heating cover. The salt solutions were added at a rate of 25 ml./min. while the temperature was maintained constant and the solutions were stirred with the aid of an electric stirrer. The water previously introduced into the flask contained aminopolycarboxylic acid to be used in the desired concentration. The strontiumchloride solution contained this acid in a concentration which was twice as great so that the concentration of the acid in the flask remained constant when the salt solutions in the flask flowed together.

To check the influence of different aminopolycarboxylic acids on the precipitation of α-SrHPO$_4$ experiments were performed in accordance with the above-mentioned example using the following aminopolycarboxylic acids: nitrilotriacetic acid (NTA); ethylenediaminotetracetic acid (EDTA); 1,2-diaminocyclohexane tetracetic acid (DCTA) and diethylenetriaminopentacetic acid (DTPA). Table I states the results of measurements of the mean grain size (with the aid of the Fisher-apparatus) and a microscope assessment of the influence on grain size and grain shape of the precipitated α-SrHPO$_4$. Furthermore, the first column of the table indicates the aminopolycarboxylic acid used and the second column states the concentration of this acid in mmol./l.

TABLE I

| Aminopoly-carboxylic acid used | Concentration in mmol/l. | Fisher Dm in μ | Microscopic assessment [1] |
|---|---|---|---|
| None | | 6.02 | Bar-shaped crystals. |
| None | | 5.85 | Do. |
| NTA [2] | 0.25 | 6.08 | Bar-shaped crystals. |
|  | 1.25 | 6.65 | Bar-shaped and rectangular crystals. |
|  | 6.25 | 12.6 | Exclusively agglomerates |
| EDTA [3] | 0.25 | 6.0 | Rectangular and square crystals. |
|  | 0.50 | 6.1 | Do. |
|  | 0.80 | 6.3 | Do. |
|  | 1.0 | 5.6 | Do. |
| DCTA | 0.125 | 6.70 | Substantially square crystals. |
|  | 0.25 | 5.62 | Do. |
| DTPA | 0.005 | 5.20 | Bar-shaped crystals. |
|  | 0.050 | 4.75 | Do. |
|  | 0.125 | 4.60 | Do. |
|  | 0.25 | 4.35 | Rectangular crystals and irregular shapes. |

[1] In all cases the height of the crystals is small relative to the other dimensions. Square crystals: length substantially equal to width. Rectangular crystals: length approximately 1.5 to twice the width. Bar-shaped crystals: length approximately 2.5 to 5 times the width.

[2] At higher NTA concentrations the Fisher Dm increases as a result of agglomeration of the crystals.

[3] As the aminopolycarboxylic acid concentration increases, the Fisher Dm decreases if the other experimental conditions are equal. For the three last-mentioned experiments using EDTA (concentrations 0.50, 0.80 and 1.0, respectively) these conditions (stirring rate and supply rate) are chosen to be different from the conditions mentioned in the example above so that in some cases a higher Fisher Dm is obtained in spite of a higher EDTA concentration.

In the figure the distribution according to grain size of the α-SrHPO₄ precipitated with the aid of EDTA is shown in a graph (curve 1). The grain size $d$ is plotted in microns on the horizontal axis. For each grain size interval the fraction of α-SrHPO₄ (in percent by weight) the sizes of which being within the said interval is plotted on the vertical axis. The points of measurements are subsequently connected together by means of a line. For the purpose of comparison the broken-line curve 2 is included which indicates the distribution according to grain size of α-SrHPO₄ manufactured on a production scale in accordance with the known method. It is clearly evident that α-SrHPO₄ manufactured in accordance with the invention has a much narrower distribution according to grain size and has much fewer fine ($<6\mu$) and coarse ($>20\mu$) grains than the known α-SrHPO₄.

Table II states the results of manufacturing methods performed on a production scale in accordance with the invention. A quantity of 300 l. of 1.75 molar strontium chloride solution and 300 l. of 1.75 molar diammonium-hydrophosphate solution were used as starting materials. The precipitation was performed in a precipitation vessel (contents 1000 l.) to which 400 l. of water containing EDTA had been added in advance. The two solutions were supplied to the vessel at a rate of 6 l./min. at a temperature of 85° C. For experiment A 20 litres of the strontiumchloride solution was added to the water in the vessel before starting the precipitation process. In addition to the mean grain size determined with the aid of the Fisher apparatus the table indicates which fraction (in percent by weight) of α-SrHPO₄ is smaller than $6\mu$ or $20\mu$, and the mean grain size calculated from the distribution according to grain size which is determined with the aid of the photosedimentometer.

TABLE II

| Experiment | Conc. EDTA in mmol/l. | Fisher Dm in μ | Distribution according to grain size percent by weight smaller than— | | Mean grain size in μ |
|---|---|---|---|---|---|
| | | | 6 μ | 20 μ | |
| A | 0.5 | 5.6 | 12 | 99 | 9.7 |
| B | 0.5 | 5.5 | 13 | 96 | 10.3 |
| C | 2 | 4.0 | 43 | 100 | 6.9 |

What is claimed is:

1. A method of manufacturing α-strontiumhydrophosphate (α-SrHPO₄) said method comprising mixing, at a temperature between 40° C. and 100° C., an aqueous solution of a water soluble strontium salt and an aqueous solution of a water soluble salt of a monohydrophosphate, at least one of said solutions containing a water soluble aminopolycarboxylic acid or water soluble salt thereof in a concentration of between $10^{-3}$ to 100 mmol per liter calculated on the overall volume of the solutions and separating the resultant precipitated α-SrHPO₄.

2. The method of claim 1 wherein the diammonium or the disodium salt of the aminopolycarboxylic acid is used.

3. The method of claim 1 wherein molar equivalent quantities of solutions are supplied to a precipitation vessel at the same rates so that the concentration of the water soluble aminopolycarboxylic acid or salt thereof is maintained constant in the precipitation vessel.

4. The method of claim 3 wherein the precipitation vessel is provided with a quantity of water heated to a temperature between 40° C. and 100° C., said water containing a water soluble aminopolycarboxylic acid or water soluble salt thereof and the two solutions of claim 3 are added with stirring to the precipitation vessel while maintaining the temperature constant.

5. A method as claimed in claim 1, wherein a quantity of from 0.05 to 5 mmol ethylenediaminotetracetic acid (EDTA) or a soluble salt thereof is added per litre to at least one of the solutions.

6. A method as claimed, wherein a quantity of from 0.01 to 1 mmol 1,2-diaminocyclohexanetetracetic acid (DCTA) or a soluble salt thereof is added per litre to at least one of the solutions.

7. A method of claim 4, wherein a quantity of from 1 to 10 vol. percent of the strontium salt solution is introduced into the precipitation vessel and that subsequently the supply of molar equivalent quantities of the two solutions is started so than an excess of hydrophosphate ions is prevented throughout the precipitation process.

8. A method of claim 4, wherein the precipitation is performed at a temperature of between 80 and 90° C.

References Cited
UNITED STATES PATENTS 3,113,835  12/1963  Aia _____ 23—109
3,118,730  1/1964  Nickerson _____ 23—109 X

FOREIGN PATENTS 368,155  3/1932  England _____ 23—109

OSCAR R. VERTIZ, Primary Examiner

C. B. RODMAN, Assistant Examiner

U.S. Cl. X.R.

23—108; 252—301.4 P

PO-1050
(5/69)

UNITED STATES PATENT OFFICE
CERTIFICATE OF CORRECTION

Patent No. 3,694,151 (PHN 4413)　　Dated September 26, 1972

Inventor(s) ADRIANUS CORNELIS JOSEPHUS MARIA SNETHORST ET AL

It is certified that error appears in the above-identified patent and that said Letters Patent are hereby corrected as shown below:

Column 1, line 5, after "Netherlands" insert -- assignors to U.S. Philips Corporation, New York, N.Y. --

Signed and sealed this 29th day of January 1974.

(SEAL)
Attest:

EDWARD M. FLETCHER, JR.　　　　RENE D. TEGTMEYER
Attesting Officer　　　　　　　　Acting Commissioner of Patents